US008381091B2

(12) United States Patent
Busch et al.

(10) Patent No.: US 8,381,091 B2
(45) Date of Patent: Feb. 19, 2013

(54) REAL-TIME METHOD, SYSTEM AND PROGRAM PRODUCT FOR COLLECTING WEB FORM DATA

(75) Inventors: Edward Vernon Busch, Raleigh, NC (US); Troy Anthony Howard, Durham, NC (US); Andrei Stephan Malacinski, Apex, NC (US); Tai Woo Nam, Cary, NC (US); Mary Catherine Streble, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 2560 days.

(21) Appl. No.: 10/244,263

(22) Filed: Sep. 16, 2002

(65) Prior Publication Data

US 2004/0054966 A1 Mar. 18, 2004

(51) Int. Cl.
*G06N 3/00* (2006.01)
(52) U.S. Cl. ......................................................... 715/221
(58) Field of Classification Search .................. 715/517, 715/513, 523, 530, 221, 234, 243, 254, 255
See application file for complete search history.

(56) References Cited

U.S. PATENT DOCUMENTS

| 5,701,451 | A  | * | 12/1997 | Rogers et al. ...................... 707/1 |
| 6,078,924 | A  |   | 6/2000  | Ainsbury et al. |
| 6,185,614 | B1 |   | 2/2001  | Cuomo et al. |
| 6,317,787 | B1 |   | 11/2001 | Boyd et al. |
| 6,381,654 | B1 | * | 4/2002  | Brawn et al. .................. 719/331 |
| 6,401,096 | B1 |   | 6/2002  | Zellweger |
| 2001/0056405 | A1 |   | 12/2001 | Muyres et al. |
| 2002/0010747 | A1 |   | 1/2002  | Jaehyuk-Hwang |
| 2002/0029290 | A1 |   | 3/2002  | Burema et al. |
| 2002/0046105 | A1 |   | 4/2002  | Gardenswartz et al. |
| 2002/0059193 | A1 |   | 5/2002  | Decime |
| 2002/0063735 | A1 |   | 5/2002  | Tamir et al. |
| 2002/0075297 | A1 |   | 6/2002  | Boulter |
| 2002/0083095 | A1 |   | 6/2002  | Wu et al. |
| 2002/0188633 | A1 | * | 12/2002 | Davis et al. ................... 707/513 |
| 2003/0088475 | A1 | * | 5/2003  | Goodman et al. .............. 705/26 |
| 2003/0217332 | A1 | * | 11/2003 | Smith et al. ................... 715/513 |

OTHER PUBLICATIONS

"AuthRequest.asp," 1998, <http://www.qc123.com/support/sup-authrequest.html>, pp. 1-5.*
Nottingham, "Caching Tutorial for Web Authors and Webmasters," <http://www.vayner.net/Docs/Caching/Caching%20%Tutoria%20 for%20Web%20Authors%20and%20Webmasters.html>. pp. 1-28.*
"Event Handler: onSubmit," 2000, <http://web.archive.org/web/20001002114757/http://www.devguru.com/Technologies/ecma-script/quickref/evhan_onsubmit.html >, p. 1.*

* cited by examiner

*Primary Examiner* — Kyle Stork
(74) *Attorney, Agent, or Firm* — Cuenot, Forsythe & Kim, LLC

(57) ABSTRACT

The present invention allows a web form submitted by a web user to be routed to an analysis system in real-time. Specifically, once a requested web page has been fully loaded and parsed, any existing submit methods and/or on-submit handlers attached to web forms within the web page are replaced with a new submit method and on-submit handler. When a valid web form is submitted by the user, the destination of the web form is changed to the analysis system, by the new submit method, for a fixed period of time. After the period of time has expired, the original destination is reinstated and the web form is routed thereto.

26 Claims, 4 Drawing Sheets

REAL-TIME METHOD, SYSTEM AND PROGRAM PRODUCT FOR COLLECTING WEB FORM DATA

BACKGROUND OF THE INVENTION

1. Field of the Invention

The present invention generally relates to a real-time method, system and program product for collecting web form data. Specifically, the present invention allows web form data to be routed to a data analysis system in real-time.

2. Background Art

As the use of websites in commerce grows, web analytics becomes an increasingly popular tool to measure website usage data. Specifically, it is advantageous for website owners to be able to see the extent and nature of the use of their websites. Some questions regarding website usage are easily answered by processing web server log files. However, collecting the data to answer more specialized questions can be extremely difficult. For example, suppose a customer wishes to check the status of a purchase order he/she made via a retailer's website. The customer will typically access the analysis system and be directed to an "order status" web (HTML) form. Using information such as his/her name and a password, the user will complete and post the web form. The user will then be given the status of his/her order. From the retailer's perspective, it could be extremely valuable to identify the customers that are most frequently checking their order's status. This would allow the retailer to adjust his/her business practices accordingly. For example, for customers most concerned about their orders' status, the retailer could use the fastest shipping method as a default whenever those customers place orders. Unfortunately, collecting specialized information such as this in an efficient manner is not currently possible using some form transmission methods.

Heretofore, website administrators have relied on log file analysis to perform web usage analysis. Specifically, when a user interacts with a website, certain HTTP data (e.g., the requested URL, the referral URL, return code, bytes transferred, user identifier, session, URL parameters, etc.) are stored as log records on the web server. This data generally appears as HTTP request data, cookie data or URL parameter data. However, the data in the log records typically only contains values from a web form that is sent to the web server via the GET method. As known in the art, the GET method appends the form data to the destination URL. Unfortunately, data sent via the GET method is restricted in length by a maximum length request, thus, hindering the volume of information that can be collected. Moreover, in order to analyze web form data using log files, the web application itself must be modified so that all web form data is submitted via the GET method. Such a restriction on the web application is generally not acceptable. Still yet, when obtaining form data to the web server via the POST method (e.g., data streaming), real-time analysis is not possible.

In view of the foregoing, there exists a need for a real-time method, system and program product for collecting web form data. A further need exists for a submit method and an on-submit handler attached to web forms within a requested web page to be replaced with a new submit method and on-submit handler. Another need exists for the new submit method to change a destination of a validated web form from a web application server to an analysis system so that the data within the web form can be collected for analysis. Still yet, a need exists for the destination to be changed back to the web application server after a predetermined period of time so that the web form can also be routed to the web application server.

SUMMARY OF THE INVENTION

In general, the present invention utilizes the POST method of transmitting data to provide a real-time method, system and program product for collecting web form data. Specifically, an initialization file and a call to the initialization file are inserted into a web page. When the web page is requested by a user, the initialization file will be called and an on-load handler will be attached to the web page. Once the web page has been fully loaded and parsed, the on-load handler will replace any existing submit methods and/or on-submit handlers attached to web forms within the web page with a new submit method and/or on-submit handler. When a user later submits a valid web form, the destination of the web form is changed from a web application server to an analysis system. Once changed, the web form is routed to the analysis system where the form data is collected. After a predetermined period of time, the destination is changed back to the web application server where the web form is then routed.

According to a first aspect of the present invention, a real-time method for collecting web form data is provided. The method comprises: (1) replacing at least one of an existing submit method with a new submit method and an existing on-submit handler with a new on-submit handler in a requested web page when the requested web page has been loaded; (2) receiving a web form having form data; (3) changing a destination of the web form to an analysis system; and (4) routing the web form to the analysis system where the form data is collected.

According to a second aspect of the present invention, a real-time method for collecting web form data is provided. The method comprises: (1) requesting a web page having an initialization file, wherein the initialization file attaches an on-load handler to the web page; (2) invoking the on-load handler when the web page is loaded, wherein the on-load handler replaces an existing submit method and an existing on-submit handler in the web page with a new submit method and a new on-submit handler; (3) caching the existing submit method and the existing on-submit handler; (4) receiving a web form having form data; (5) invoking the cached on-submit handler to validate the web form; (6) changing a destination of the web form from a web application server to an analysis system, after the web form is validated; (7) routing the web form to the analysis system where the form data is collected; (8) changing the destination of the web form back to the web application server after a predetermined period of time; and (9) routing the web form to the web application server.

According to a third aspect of the present invention, a real-time system for collecting web form data is provided. The method system: (1) a replacement system for replacing at least one of an existing submit method with a new submit method and an existing on-submit handler with a new on-submit handler in a requested web page when the requested web paged has been loaded; (2) a submission system for submitting a web form having form data; (3) a destination system for changing a destination of the web form to an analysis system; and (4) a routing system for routing the web form to the analysis system, wherein the form data is collected on the analysis system.

According to a fourth aspect of the present invention, a program product stored on a recordable medium for real-time collecting of web form data is provided. When executed, the program product comprises: (1) program code for replacing at least one of an existing submit method with a new submit method and an existing on-submit handler with a new on-submit handler in a requested web page when the requested web paged has been loaded; (2) program code for submitting a web form having form data; (3) program code for changing a destination of the web form to an analysis system; and (4) program code for routing the web form to the analysis system, wherein the form data is collected on the analysis system.

Therefore, the present invention provides a real-time method, system and program product for collecting web form data.

BRIEF DESCRIPTION OF THE DRAWINGS

These and other features of this invention will be more readily understood from the following detailed description of the various aspects of the invention taken in conjunction with the accompanying drawings in which.

Figure 1:
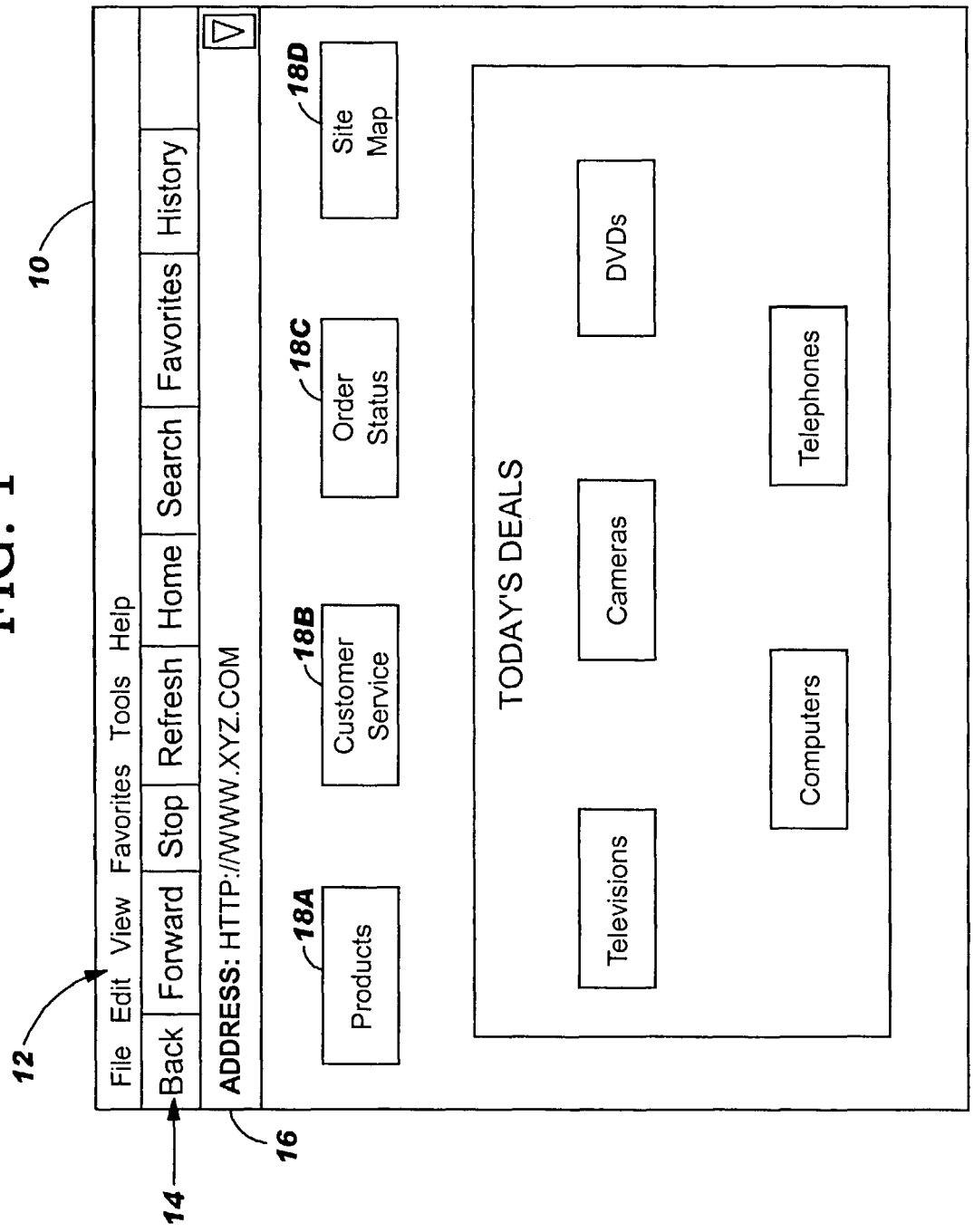
FIG. 1 depicts an exemplary web page, according to the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

In general, the present invention utilizes the POST method of transmitting data to provide a real-time method, system and program product for collecting web form data. Specifically, an initialization file and a call to the initialization file are inserted into a web page. When the web page is later requested by a user, the initialization file will be called and an on-load handler will be attached to the web page. Once the web page has been fully loaded and parsed, the on-load handler will replace any existing submit methods and/or on-submit handlers attached to web forms within the web page with a new submit method and/or on-submit handler. When a user later submits a valid web form, the destination of the web form is changed from a web application server to an analysis system. Once changed, the web form is routed to the analysis system where the form data is collected. After a predetermined period of time, the destination is changed back to the web application server where the web form is then routed.

Referring now to FIG. 1, an exemplary web page 10 is shown. Web page 10 is intended to represent any web page and can include features such as menus 12, navigation buttons 14 and address bar 16. Also shown are feature buttons 18A-D, which can be manipulated by a user to navigate about the website to which web page 10 belongs. In some circumstances, a user may access a web form to obtain information. For example, if the user selected order status button 18C, an order status web form would be displayed for the user to complete and submit to obtain the status of a pending order.

Figure 2:
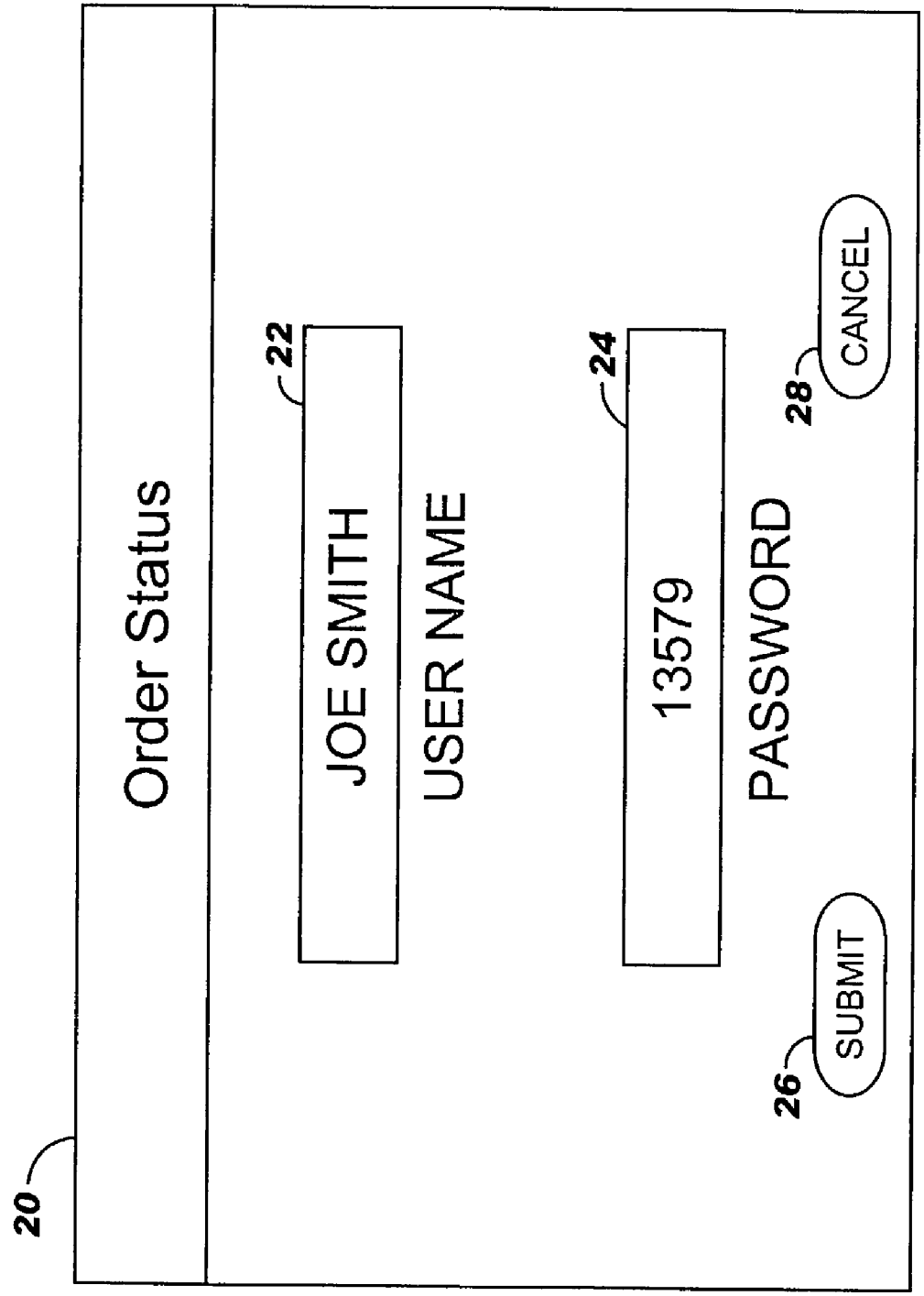
FIG. 2 depicts an exemplary web form, according to the present invention.

Referring to FIG. 2, an exemplary order status web (HTML) form 20 is shown. As depicted, if user wishes to obtain the status of an order he/she placed, the user would input form data into fields 22 and 24. Examples of form data that could be inputted are the user's name and a password previously designated. It should be understood, however, that the precise type of data inputted is not intended to be a limiting part of the present invention. Rather, the teachings described herein could be implemented with respect to any type of web form and accompanying form data. Once the data has been inputted, the user could select submit button 26 to submit the form and obtain the order's status, or the cancel button 28 to return to web page 10. Upon submission and validation, web form 20 is sent to an analysis system where the form data is collected for analysis. In general, this occurs by adapting web page 10 so that the destination of any underlying web form is changed to the analysis server. After the fixed period of time has elapsed, the destination will be changed back to the original destination (e.g., the web application server) where the web form will also be routed.

Figure 3:
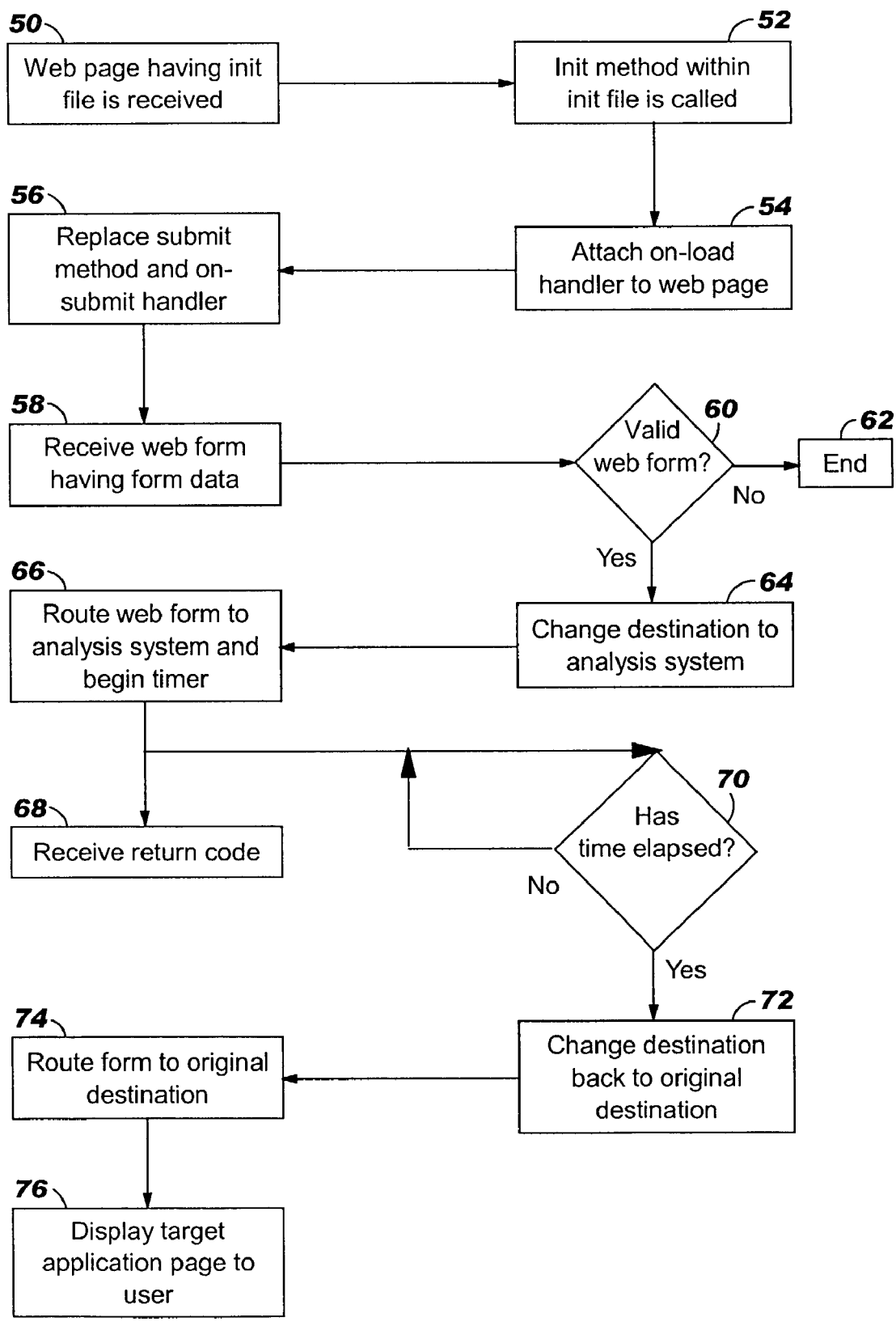
FIG. 3 depicts a method flow diagram, according to the present invention.

Referring to FIG. 3, a method flow diagram of this process is shown. Typically, the process begins when a requested web page is received on the user's computer system in step 50. In a typical embodiment, the requested web page includes a URL to an initialization file (e.g., a JavaScript file). As the web page is being loaded the initialization file is typically retrieved. Once the web page is received on the user's computer system, an initialization method within the initialization file is called in step 52. Once called, an on-load handler is attached to the web page in step 54. Then, once the web page is completely loaded and parsed, the on-load handler will be invoked in step 56. Specifically, once invoked, the on-load handler will replace any existing submit methods and/or on-submit handlers attached to web forms in the web page/website with a new submit method and/or on-submit handler. Once replaced, the existing submit method and/or on-submit handler can be stored in cache memory. The new submit method and/or on-submit handler allow a completed web form to be routed to an analysis server before being routed to the original destination (e.g., the web application server). To this extent, if a web form having form data is received from a user in step 58, it will first be determined whether the web form is valid in step 60. Specifically, upon submission of the web form by the user via submission button 26 (FIG. 2), the new on-submit handler will be invoked. In turn, the new on-submit handler will invoke the cached on-submit handler, which will validate the form. If the form is not valid, the process will end in step 62. If, however, the form is valid, the new on-submit handler will change the destination of the web form to the analysis system in step 64. If the web form was submitted by selection of a HTML element other than submission button 26, and the web form was valid, the new submit method will be invoked. Once invoked, the new submit method will change the destination of the web form to the analysis system. In either event, once the destination is changed, the cached submit method is then called to route the web form to the analysis system (new destination) in step 66. As this occurs, a timer is commenced that will run for a predetermined period of time. The timer is to allow sufficient time for the web form to be transmitted to the analysis system. When the analysis system receives the web form, it could transmit a return code (e.g., a 302—"no content" code) in step 68. In any event, it will be determined whether the predetermined period of time has elapsed in step 70. If the predetermined time has not yet elapsed, the destination will remain as the analysis system. However, once the time has elapsed in step 70, the new on-submit handler or the new submit method (depending on how the web form was submitted) will cause the destination of the web page to be changed back to the original destination (e.g., the web application server) in step 72. Then, the cached submit method will be called to route the web form to the original destination in step 74. Lastly, the target web page (e.g., showing the status of the user's order) will be displayed in step 76.

Thus, the present invention allows a web form to be routed both to an analysis server as well as an original destination such as a web application server. In addition, because the form is intercepted upon submission by the user, the form data is collected on the analysis system in a real-time.

Figure 4:
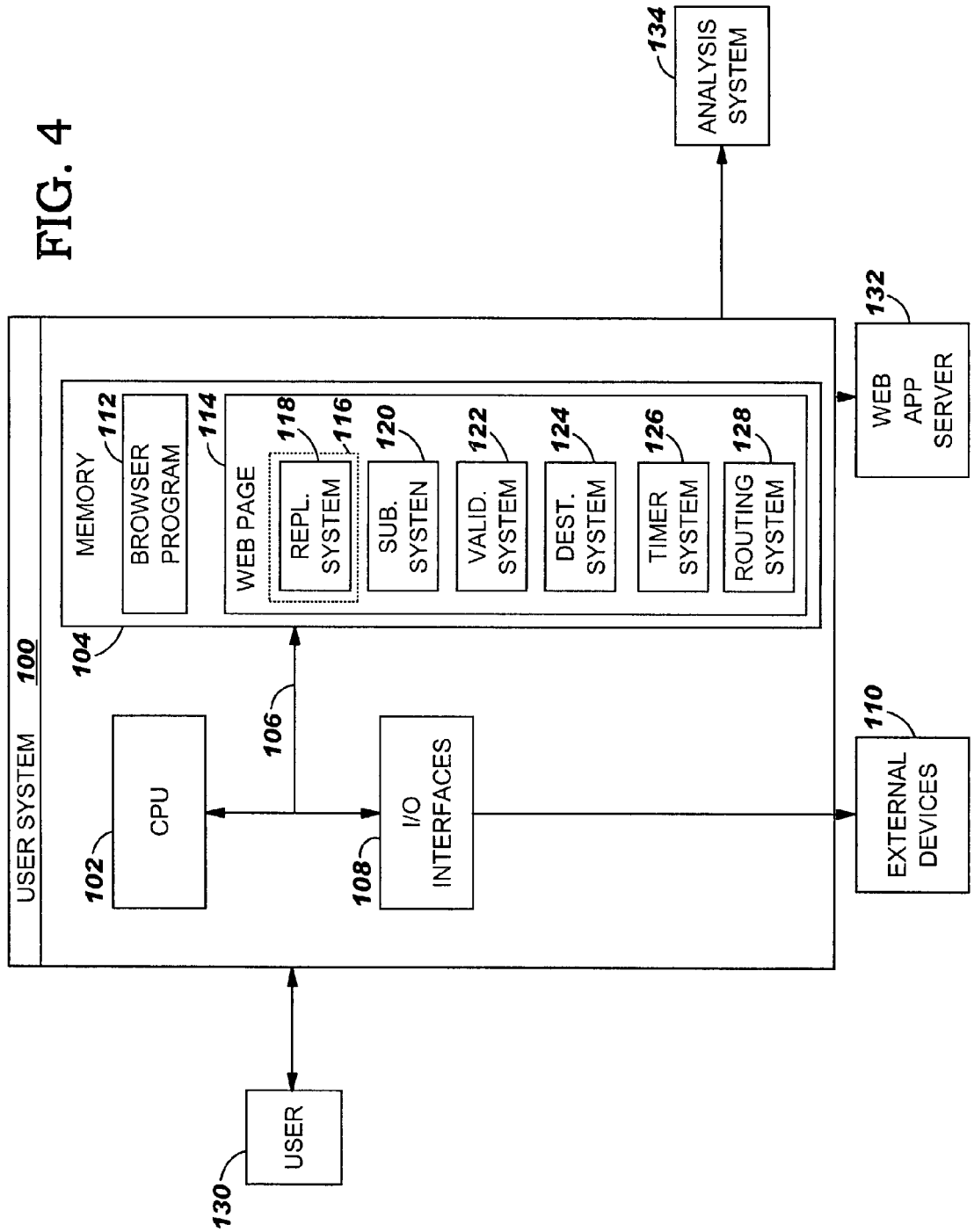
FIG. 4 depicts a user system having a browser program and a web page, according to the present invention.

It should be understood that although the present invention is typically enabled by encapsulating all invention-specific code within one downloadable file (e.g., the initialization file), other variations exist. For example, it is equally possible to embed the functionality described herein within the original web page itself. In addition, although a typical embodiment of the present invention involves the replacement of both an existing submit method and an existing on-submit handler with a new submit method and a new on-submit handler, any variation could be implemented. For example, the teachings of the present invention could be implemented by replacing either the existing submit method or the existing on-submit handler (i.e., replace at least one of the two). Referring now to FIG. 4, a more detailed depiction user's computer system 100 in relation to web application server 132 and analysis system 134 is shown. As depicted, user system 100 generally includes central processing unit (CPU) 102, memory 104, bus 106, input/output (I/O) interfaces 108 and external devices/resources 110. CPU 102 may comprise a single processing unit, or be distributed across one or more processing units in one or more locations, e.g., on a client and server. Memory 104 may comprise any known type of data storage and/or transmission media, including magnetic media, optical media, random access memory (RAM), read-only memory (ROM), a data cache, a data object, etc. Moreover, similar to CPU 102, memory 104 may reside at a single physical location, comprising one or more types of data storage, or be distributed across a plurality of physical systems in various forms.

I/O interfaces 108 may comprise any system for exchanging information to/from an external source. External devices/resources 110 may comprise any known type of external device, including speakers, a CRT, LED screen, hand-held device, keyboard, mouse, voice recognition system, speech output system, printer, monitor, facsimile, pager, etc. Bus 106 provides a communication link between each of the components in user system 100 and likewise may comprise any known type of transmission link, including electrical, optical, wireless, etc. In addition, although not shown, additional components, such as cache memory, communication systems, system software, etc., may be incorporated into user system 100.

It should be understood that communication between user system 100, web application server 132 and analysis system 134 can occur via a direct hardwired connection (e.g., serial port), or via an addressable connection (e.g., the Internet, a LAN, a WAN, a VPN, or other network) in a client-server (or server-server) environment. In the case of the latter, the server and client may be connected via the Internet, wide area networks (WAN), local area networks (LAN) or other private networks. The server and client may utilize conventional network connectivity, such as Token Ring, Ethernet, or other conventional communications standards. Where the client communicates with the server via the Internet, connectivity could be provided by conventional TCP/IP socketsbased protocol. In this instance, the client would utilize an Internet service provider to establish connectivity to the server. It should also be understood that although not shown for brevity purposes, web application server 132 and analysis system 134 typically include computerized components similar to user system 100.

Stored in memory of user system 100 is browser program 112 and requested web page 114. Browser program 112 is intended to represent any type of web browser such as EXPLORER or NETSCAPE. Included in web page 114 are functional systems (program code) such as replacement system 118, submission system 120, validation system 122, destination system 124, timer system 126 and routing system 128. As indicated above, the present invention allows a web form submitted by user 130 to be routed first to analysis system 134, and then to web application server 132 (or some other original destination).

When web page 114 is loaded and parsed, replacement system 118 will replace (and cache) any existing submit methods and/or on-submit handlers with a new submit method and/or on-submit handler. To this extent, replacement system 118 can comprise an on-load handler or a call to an on-load handler that was described above. Moreover, replacement system 118 can be "spawned" (and attached to web page 114) when an initialization method within initialization file 116 that has been loaded into web page 114 is called. In any event, once user 130 completes and submits a web form via submission system 120 (which can be any known system for submitting a web form), validation system 122 will validate the form. Specifically, upon "submission" of a web form by user 130, the new on-submit handler will be invoked, which will cause the cached on-submit handler to be invoked. The cached on-submit handler will then validate the submitted web form. Once the form has been validated, destination system 124 will change a destination of the web form to analysis system 134 (e.g., by calling the new submit method or the new on-submit handler, depending on how the form was submitted). Specifically, if the web form was submitted via a submission button, the destination will be changed by the on-submit handler. Conversely, if the web form was submitted via some other HTML element, the new submit method will be invoked to change the destination of the web form. In either event, once the destination has been changed, routing system 128 will route the web form to analysis system 134, and timer system 126 will begin tracking the predetermined amount of time. As indicated above, the predetermined amount of time is to ensure that the routing system 128 has sufficient time to transmit the web form to the analysis system 134. Once the predetermined amount of time expires, destination system 124 will change the destination back to the original destination (e.g., back to web application server 132 by calling the new submit method) and routing system 128 will route the web form thereto (e.g., by calling the cached submit method). Once this process is complete, the target web page can be displayed for user 130.

It is understood that the present invention can be realized in hardware, software, or a combination of hardware and software. Any kind of computer/server system(s)—or other apparatus adapted for carrying out the methods described herein—is suited. A typical combination of hardware and software could be a general purpose computer system with a computer program that, when loaded and executed, controls user system 100 such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, although the present invention is typically implemented using JavaScript technology, other programming technologies could be utilized. Moreover, the teachings of the present invention could be implemented in conjunction with any type of web form. An order status web form was depicted and described herein for illustrative purposes only.

The invention claimed is:

1. A real-time method for collecting web form data, comprising:
    replacing at least one of an existing submit method with a new submit method and an existing on-submit handler with a new on-submit handler attached to a web form in a requested web page when the requested web page has been loaded;
    receiving the web form having form data;
    changing a destination for routing the web form based on validation of the form data received to an analysis system; and
    routing the web form to the analysis system where the form data is collected.

2. The method of claim 1, further comprising changing the destination of the web form back to an original destination after a predetermined period of time.

3. The real-time method of claim 2, further comprising calling the existing submit method to route the web form to the original destination, after the destination has been changed back to the original destination, wherein information in the web form routed to the original destination is the same as that in the web form routed to the analysis system.

4. The real-time method of claim 1, wherein the requested web page includes an initialization file that attaches an on-load handler to the requested web page, and wherein the onload handler replaces at least one of the existing submit method and the existing on-submit handler with the new submit method and the new on-submit handler when the requested web paged has been loaded and parsed.

5. The real-time method of claim 1, further comprising caching the existing submit method and the existing on-submit handler when replaced.

6. The real-time method of claim 1, further comprising validating the web form by invoking the existing on-submit handler, prior to changing the destination to the analysis system.

7. The real-time method of claim 1, wherein the form data is collected on the analysis system by calling the existing submit method, and wherein the analysis system responds with a return code.

8. A real-time method of collecting web form data, comprising:
    requesting a web page having an initialization file, wherein the initialization file attaches an on-load handler to the web page;
    invoking the on-load handler when the web page is loaded, wherein the on-load handler replaces an existing submit method and an existing on-submit handler attached to a web form in the web page with a new submit method and a new on-submit handler;
    caching the existing submit method and the existing on-submit handler;
    receiving the web form having form data;
    invoking the cached on-submit handler to validate the web form;
    changing a destination for routing the web form based on validation of the form data received from a web application server to an analysis system, after the web form is validated;
    routing the web form to the analysis system where the form data is collected;
    changing the destination for routing the web form back to the web application server after a predetermined period of time; and
    routing the web form to the web application server, wherein information in the web form routed to the web application server is the same as that in the web form routed to the analysis system.

9. The method of claim 8, wherein the cached on-submit handler is invoked by the new on-submit handler.

10. The method of claim 8, wherein the web form is routed to the web application server and the analysis system by calling the cached submit method.

11. A real-time system of collecting web form data comprising,
    a replacement system including a processor configured to replace at least one of an existing submit method with a new submit method and an existing on-submit handler with a new on-submit handler attached to a web form in a requested web page when the requested web page has been loaded;
    a submission system for submitting the web form having form data;
    a destination system for changing a destination for routing the web form based on validation of the form data received to an analysis system; and
    a routing system for routing the web form to the analysis system for a predetermined period of time, wherein the form data is collected on the analysis system.

12. The real-time system of claim 11, wherein the replacement system comprises an on-load handler that is attached to the web page upon invocation of an initialization method within an initialization file in the web page.

13. The real-time system of claim 12, wherein the web page further comprises an initialization call for invoking the initialization method.

14. The real-time system of claim 11, further comprising a timer system for tracking the predetermined period of time.

15. The real-time system of claim 11, further comprising a validation system for validating the web form, prior to changing the destination to the analysis system.

16. The real-time system of claim 11, wherein the existing submit method and the existing on-submit handler are stored in cache when replaced.

17. The real-time system of claim 11, wherein the destination system further changes the destination to a web application server after the predetermined period of time has elapsed.

18. The real-time system of claim 17, wherein the routing system further routes the web form to the web application server after the destination has been changed back to the web application server, and wherein information in the web form routed to the web application server is the same as that in the web form routed to the analysis system.

19. A program product stored on a data storage medium for real-time collecting of web form data, which when executed, comprises:

program code for replacing at least one of an existing submit method with a new submit method and an existing on-submit handler with a new on-submit handler attached to a web form in a requested web page when the requested web page has been loaded;

program code for submitting the web form having form data;

program code for changing a destination for routing the web form based on validation of the form data received to an analysis system; and program code for routing the web form to the analysis system for a predetermined period of time, wherein the form data is collected on the analysis system.

20. The program product of claim 19, wherein the program code for replacing comprises an on-load handler that is attached to the web page upon invocation of an initialization method within an initialization file in the web page.

21. The program product of claim 20, wherein the web page further comprises an initialization call for invoking the initialization method.

22. The program product of claim 19, further comprising a timer system for tracking the predetermined period of time.

23. The program product of claim 19, further comprising program code for validating the web form, prior to changing the destination to the analysis system.

24. The program product of claim 19, wherein the existing submit method and the existing on-submit handler are stored in cache when replaced.

25. The program product of claim 19, wherein the program code for changing further changes the destination to a web application server after the predetermined period of time has elapsed.

26. The program product of claim 25, wherein the program code for routing further routes the web form to the web application server after the destination has been changed back to the web application server, and wherein information in the web form routed to the web application server is the same as that in the web form routed to the analysis system.

* * * * *